US011918834B2

(12) United States Patent
Brookes

(10) Patent No.: US 11,918,834 B2
(45) Date of Patent: *Mar. 5, 2024

(54) SNOW BURIAL SURVIVAL MASK

(71) Applicant: Steven Brookes, Irvine, CA (US)

(72) Inventor: Steven Brookes, Irvine, CA (US)

( * ) Notice: Subject to any disclaimer, the term of this patent is extended or adjusted under 35 U.S.C. 154(b) by 609 days.

This patent is subject to a terminal disclaimer.

(21) Appl. No.: 17/086,040

(22) Filed: Oct. 30, 2020

(65) Prior Publication Data

US 2021/0046335 A1 Feb. 18, 2021

Related U.S. Application Data

(63) Continuation of application No. 15/698,619, filed on Sep. 7, 2017, now Pat. No. 10,850,140.

(60) Provisional application No. 62/384,578, filed on Sep. 7, 2016.

(51) Int. Cl.

| | |
|---|---|
| ***A62B 18/00*** | (2006.01) |
| ***A41D 13/11*** | (2006.01) |
| ***A42B 1/008*** | (2021.01) |
| ***A42B 3/28*** | (2006.01) |
| ***A62B 7/12*** | (2006.01) |
| ***A62B 9/00*** | (2006.01) |
| ***A62B 9/06*** | (2006.01) |
| ***A62B 18/02*** | (2006.01) |
| ***A62B 18/10*** | (2006.01) |
| ***A62B 33/00*** | (2006.01) |
| *A63B 29/00* | (2006.01) |

(52) U.S. Cl.

CPC ............ *A62B 18/006* (2013.01); *A41D 13/11* (2013.01); *A42B 1/008* (2013.01); *A42B 3/288* (2013.01); *A62B 7/12* (2013.01); *A62B 9/006* (2013.01); *A62B 9/06* (2013.01); *A62B 18/02* (2013.01); *A62B 18/10* (2013.01); *A62B 33/00* (2013.01); *A63B 29/00* (2013.01)

(58) Field of Classification Search

CPC ....... A62B 33/00; A62B 18/006; A62B 18/02; A62B 9/006; A62B 7/12; A41D 13/11; A41D 27/28; A63B 29/00; A63B 33/00

See application file for complete search history.

(56) References Cited

U.S. PATENT DOCUMENTS 4,055,173 A * 10/1977 Knab ................. A41D 13/1153 128/201.29

4,141,086 A * 2/1979 Jackson ................... A42C 5/04 2/909

4,683,869 A * 8/1987 Wilcox ..................... A61F 7/02 128/201.13

(Continued)

*Primary Examiner* — Bradley H Philips

*Assistant Examiner* — Savannah L Gabriel

(74) *Attorney, Agent, or Firm* — InnoventLaw; Karima Gulick; Hsiang Cheng

(57) ABSTRACT

A snow burial survival mask has an exhaust tube connected to a headgear. An intake port of the exhaust tube is positioned adjacent to a breathing portion of the headgear in order to intake exhaled carbon dioxide (CO2)-rich air. An air pump connected to the exhaust tube pump the exhaled air from the intake port to an exhaust port away from the user's face, extending survival time in a snow burial situation. At least one burial detection sensor such as a motion sensor, light sensor and/or CO2 sensor is configured to activate the air pump based on detection of a burial event.

20 Claims, 6 Drawing Sheets

(56) References Cited

U.S. PATENT DOCUMENTS

| | | | | | |
|---|---|---|---|---|---|
| 4,848,366 | A * | 7/1989 | Aita | A41D 13/1192 | 128/206.28 |
| 5,046,492 | A * | 9/1991 | Stackhouse | A62B 18/04 | 128/205.12 |
| 2006/0035622 | A1 * | 2/2006 | Kampel | A63B 29/021 | 455/575.1 |
| 2010/0243756 | A1 * | 9/2010 | Auerbach | A63B 29/021 | 239/289 |
| 2010/0255809 | A1 * | 10/2010 | Aschauer | A63B 29/021 | 455/404.2 |
| 2013/0014316 | A1 * | 1/2013 | Castro | G02C 11/00 | 2/427 |
| 2013/0104900 | A1 * | 5/2013 | Tobias | A62B 18/088 | 128/205.27 |
| 2015/0027446 | A1 * | 1/2015 | Brega | A62B 18/02 | 128/206.16 |
| 2015/0290478 | A1 * | 10/2015 | Curran | A61M 16/208 | 128/205.27 |
| 2017/0274229 | A1 * | 9/2017 | Werz | A62B 33/00 | |

* cited by examiner

SNOW BURIAL SURVIVAL MASK

CROSS-REFERENCE TO RELATED APPLICATIONS

This application claims priority to, and is a Continuation of, U.S. patent application Ser. No. 15/698,619, filed Sep. 7, 2017, now pending, which claims priority to the U.S. Provisional Patent application Ser. No. 62/384,578 filed on Sep. 7, 2016. Although incorporated by reference in its entirety, no arguments or disclaimers made in the parent application apply to this continuation application. Any disclaimer that may have occurred during the prosecution of the above-referenced application is hereby expressly rescinded.

FIELD OF THE INVENTION

The present invention relates generally to safety equipment. More particularly, the present invention relates to a personal survival device in the event of accidental snow burial by avalanche or tree well encounter.

BACKGROUND OF THE INVENTION

A winter sport or winter activity is a recreational activity or sport which is played on snow or ice. Most such sports are variations of skiing, ice skating and sledding. Traditionally such sports were only played in cold areas during winter, but artificial snow and artificial ice allow more flexibility. Artificial ice can be used to provide ice rinks for ice skating, ice hockey and bandy in a milder climate.

Common individual sports include cross-country skiing, Alpine skiing, snowboarding, ski jumping, speed skating, figure skating, luge, skeleton, bobsleigh and snowmobiling. Common team sports include ice hockey, curling and bandy. Winter sports often have their own multi-sport tournaments, such as the Winter Olympic Games.

In winter sports such as skiing, snowboarding, snowmobiling, snow hiking, showshoeing, or other activities involving traversing through snowy areas, often down mountains or hills, significant danger is posed to the participants by snow burial by avalanche or falling into a tree well. A tree well is a void of area or loose snow around the trunk of a tree enveloped in deep snow. The branches of the tree form a cover around the base of the trunk, thus preventing snow from accumulating around the trunk of the tree in a uniform manner to the surrounding environment and forming a void into which individuals may fall. Such wells have been observed as deep as 20 feet.

Falling into tree wells while skiing, snowboarding or otherwise traversing a snow-covered mountain slope is a main cause of fatalities in winter sports. Victims can get trapped in tree wells and become unable to free themselves. Frequently, victims end up in wells head first, complicating recovery efforts, and are often they are injured in the process, suffering joint dislocation or concussion. If an individual is unfortunate enough for this to happen while skiing alone, they may have a less than 10% chance of survival without safety and survival equipment suited to the purpose. In addition to dangers from cold exposure, dehydration and hunger from being physically trapped in the tree well, individuals may also find their head buried by snow. Following a snow burial incident, a buildup of carbon dioxide, not a shortage of oxygen, will often result in suffocation if the individual is not extracted within the first few minutes.

Therefore, it is an objective of the present invention to provide a piece of survival equipment, specifically a mask, which draws CO2 away from the user's airways and deposits it behind their back, thereby extending survival time and greatly increasing the chances of successful extraction.

The main advantage of the present invention is that user action is not required for functionality. The user is automatically protected through and air pump activated by one or more sensors that can detect a burial condition.

DETAILED DESCRIPTION OF THE INVENTION

Figure 1:
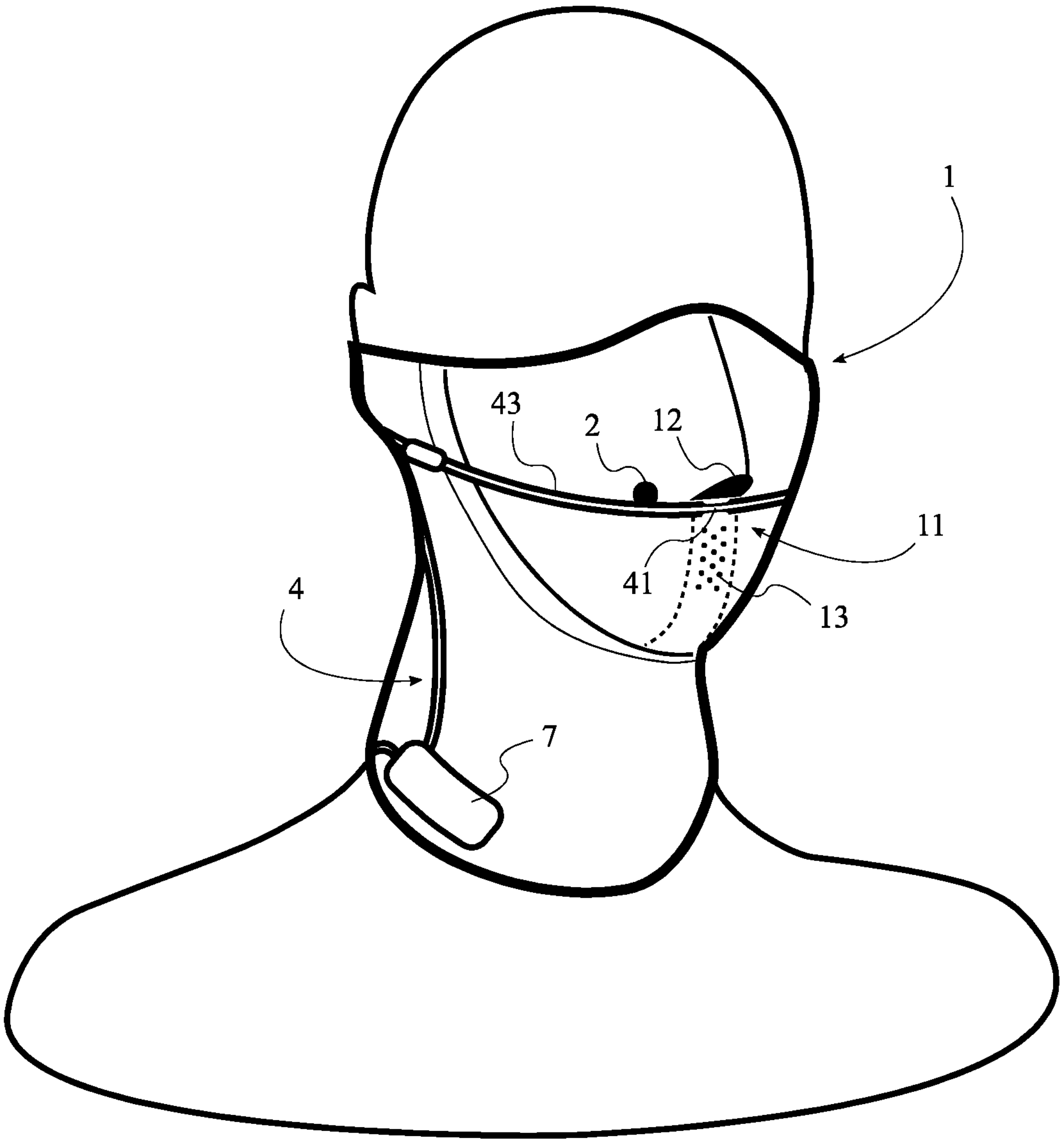
FIG. 1 is an illustration of the present invention being worn by a user.
Figure 2:
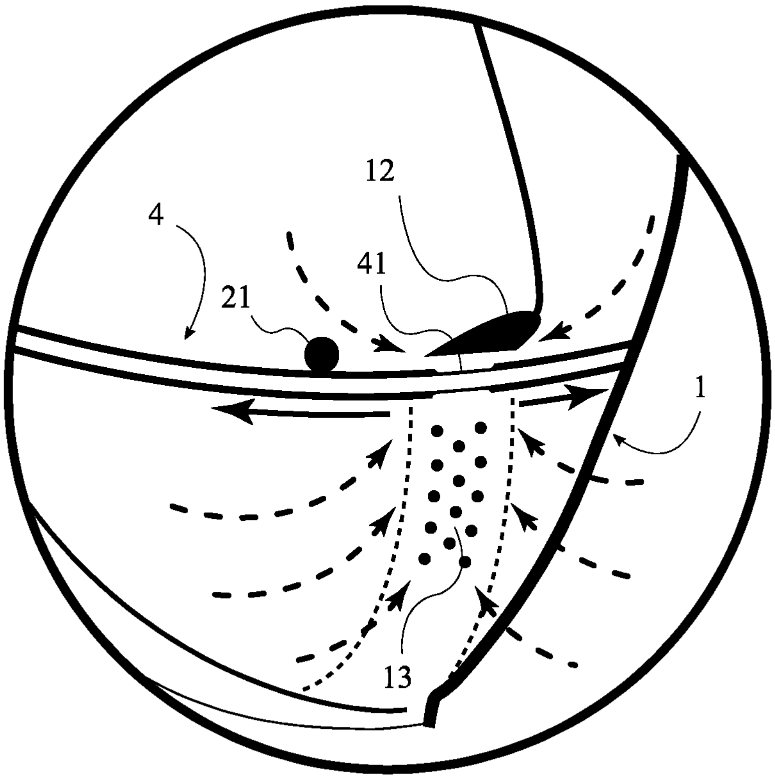
FIG. 2 is a close-up view of the present invention illustrating airflow being drawn into the intake port of the exhaust tube.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention.

The present invention is an apparatus for use by skiers, snowboarders, snowmobilers, hikers, snowshoers, and any other activity involving avalanche or tree well exposure. The present invention extends survival time in the event of accidental snow burial by avalanche or tree well encounter.

Following a snow burial incident, a buildup of carbon dioxide (not a shortage of oxygen) will often result in suffocation if the individual is not extracted within the first few minutes. When triggered (by a reduction in light, movement, or other metrics) the present invention draws carbon dioxide (CO2) away from the user's airways and deposited it behind the users back, thereby extending survival time and greatly increasing the chances of successful extraction.

The present invention is a mask which can afford an individual a much greater chance of survival in case of being buried in snow due to an avalanche or falling into a tree well. In such cases, the buildup of carbon dioxide (CO2) gas can quickly be fatal. The present invention can detect a burial event and automatically trigger a pumping mechanism to move air from the user's immediate breathing area to another area, such as behind the user's back, thus removing CO2 buildup around the user's nose and mouth and extending survival time. The present invention may also be activated manually in some embodiments, by covering a light sensor in order to trigger the pump in order to remove exhaled air containing moisture in order to de-fog the user's goggles. Additionally or alternatively, the user may activate a switch to perform the same function. This functionality may only be available is the battery reserves of the present invention is over a specified threshold, such as 50% charge, in order to ensure adequate battery power to function in case of a burial event.

The advantages of the present invention over existing products include: the present invention activates automatically in the event of a snow burial; the present invention does not require the user to be conscious to be effective; the present invention is continuously ready to activate; the present invention may provide demisting of the user's goggles, increasing visibility and therefore safety; the present invention has mechanical and electrical components that facilitate automatic function in case of a snow burial.

In general, referring to FIGS. 1-5, the present invention comprises a headgear 1, at least one burial sensor 2, a power source 3, an exhaust tube 4, and an air pump 5. In some embodiments, the headgear 1 is a face mask. In some embodiments, the headgear 1 may be a helmet, a wearable wire frame, an arrangement of straps, or any other head-wearable object that is able to facilitate the spirit of the present invention. The headgear 1 may be made of various fabrics, textiles, plastics, metals, or other materials, and may be manufactured according to any known or new manufacturing process.

The headgear 1 comprises a breathing portion 11, as shown in FIG. 1. The breathing portion 11 represents a location on the headgear 1 that will be located near a user's nose and/or mouth while the present invention is being worn. The exhaust tube 4 comprises an intake port 41 and an exhaust port 42. The intake port 41 of the exhaust tube 4 is connected to the headgear 1 adjacent to the breathing portion 11. The power source 3 is electrically connected to the at least one burial sensor 2 and the air pump 5, and the air pump 5 is operatively connected to the exhaust tube 4, such that the air pump 5 functions to pump air from the intake port 41 to the exhaust port 42. Preferably, the power source 3 comprises at least one battery 31. The power source 3 may be one or more rechargeable batteries, and the power source 3 may either be removable or non-removable in various embodiments.

In some embodiments, the breathing portion 11 comprises a nose portion 12 and a mouth portion 13, as known to exist on some types of headgear 1 such as cold weather face masks. In such a case, the intake port 41 of the exhaust tube 4 is positioned between the nose portion 12 and the mouth portion 13. It should be understood that the exhaust tube 4 may be affixed to the headgear 1 in any relevant manner, such as, but not limited to, being sewn or stitched into a fabric lining of the headgear 1, connected to an external or interior surface of the headgear 1 through fasteners such as clips, buckles, or snaps, or any other appropriate means.

Figure 3:
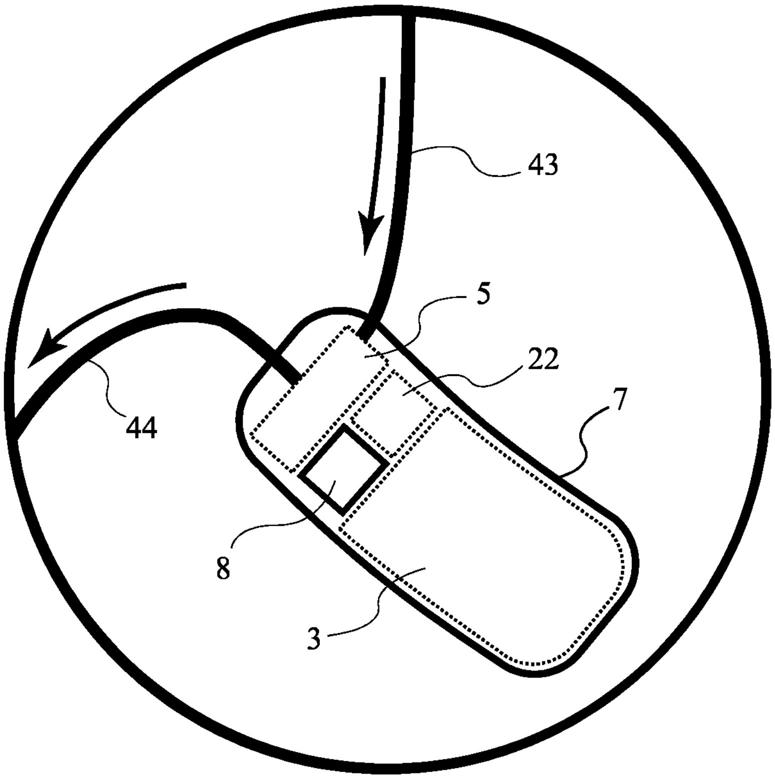
FIG. 3 is an illustration of the electronics package of the present invention.
Figure 4:
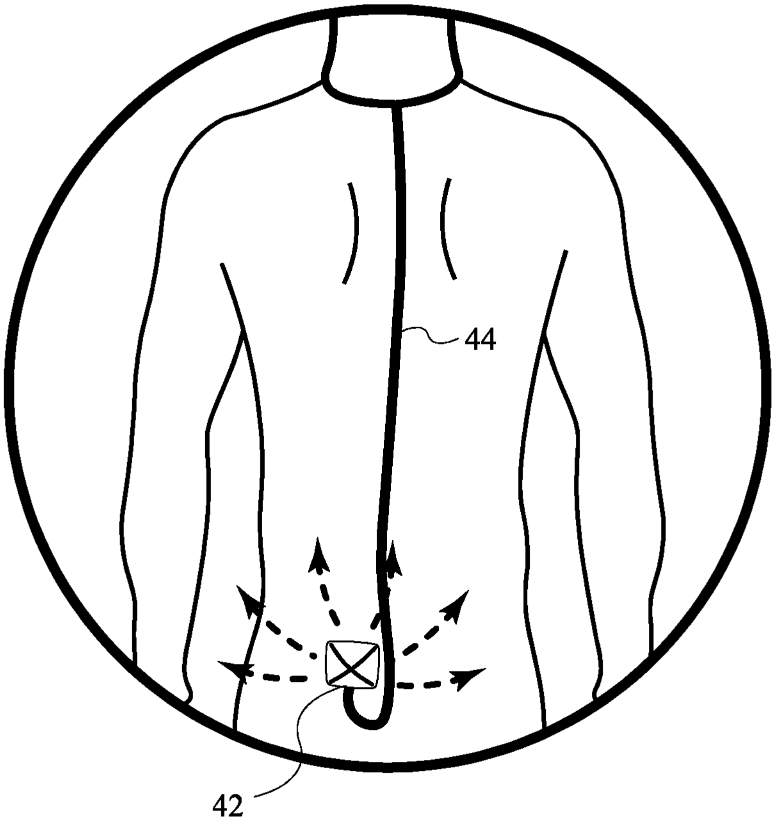
FIG. 4 is an illustration of the exhaust tube venting air behind the user's back.

In the preferred embodiment, the exhaust tube 4 comprises an intake tube portion 43 and an exhaust tube portion 44, and the air pump 5 is operatively connected between the intake tube portion 43 and the exhaust tube portion 44, as illustrated in FIG. 3. The intake port 41 traverses into the intake tube portion 43 opposite the air pump 5, and the exhaust port 42 traverses into the exhaust tube portion 44 opposite the air pump 5. The intake tube portion 43 is connected to the headgear 1, preferably adjacent the breathing portion 11, and more particularly between the nose portion 12 and the mouth portion 13, though various embodiments of the present invention may place the intake tube portion 43 in other locations on the headgear 1. The exhaust port 42 of the exhaust tube portion 44 may be free to be manipulated into any desired position, though it is ideal to position the exhaust port 42 behind the back of the user for most efficient displacement of CO2, as shown in FIG. 4. Some embodiments may furthermore or alternatively comprise an attachment clip arrangement to which the exhaust port 42 is connected, allowing the user to affix the exhaust port 42 to the waistband of their pants or another location or item of clothing.

In some embodiments, the present invention may further comprise a harness worn on the torso of the user, to which the exhaust tube 4 is connected behind the back of the user. The intake tube portion 43 and the exhaust tube portion 44 are connected in fluid communication to the air pump 5 such that air is forced by the air pump 5 to travel from the intake port 41, through the intake tube portion 43, through the air pump 5, through the exhaust tube portion 44, and out the exhaust port 42.

It is contemplated that various different configurations of the exhaust tube 4 may be utilized in various embodiments of the present invention. For example, in one embodiment, a face portion of the intake tube portion 43 may wrap around the face of the user in a loop arrangement, with a connection portion being connected between the face portion and the air pump 5.

Figure 5:
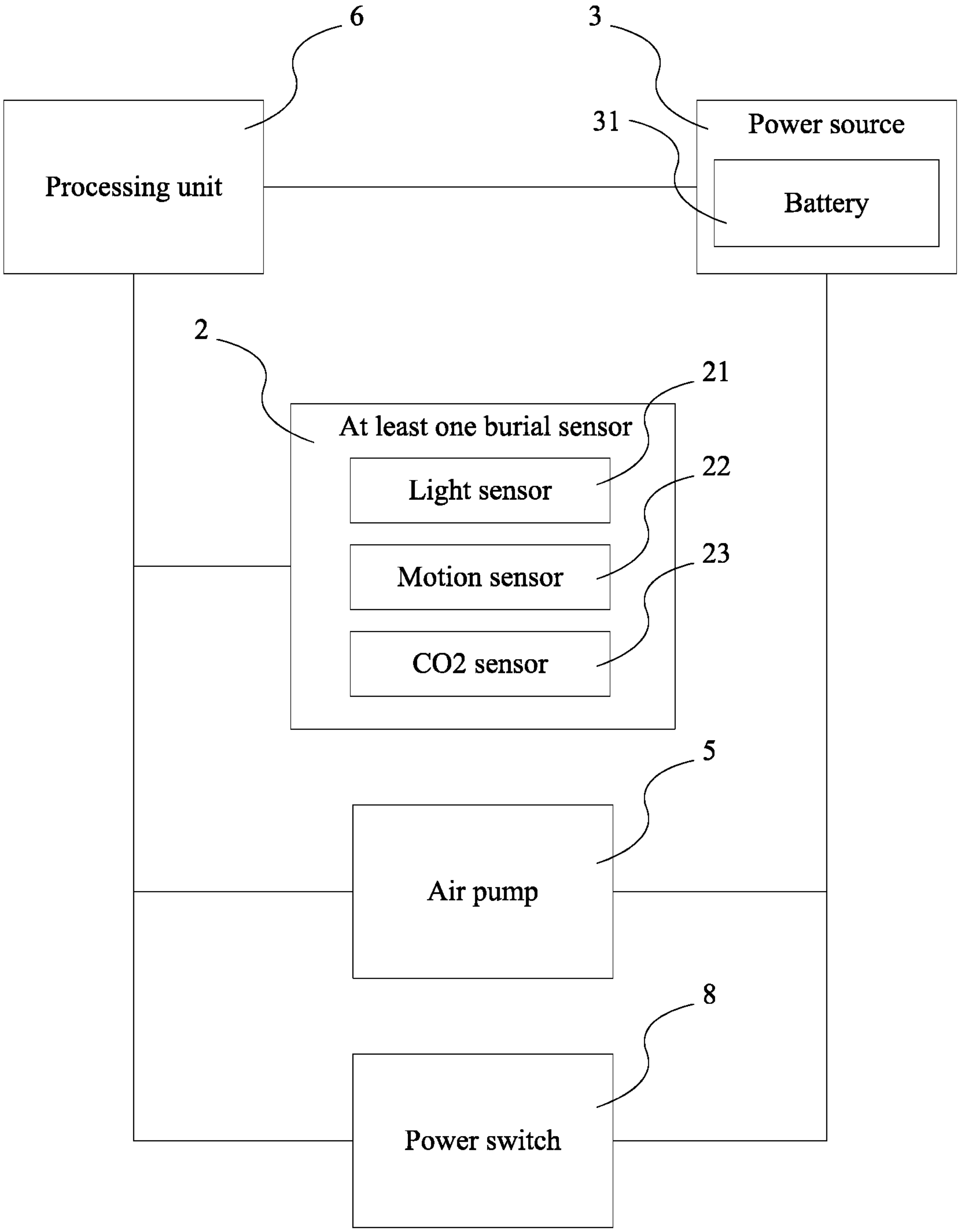
FIG. 5 is a general diagram of the electronic components of the present invention.

The at least one burial sensor 2 is important to the functionality of the present invention. Referring to FIG. 5, in various embodiments, it is contemplated that the at least one burial sensor 2 may be any type of sensor or combination of sensors which can detect various indications of snow burial. In some embodiments, the at least one burial sensor 2 comprises a light sensor 21 shown in FIG. 2. The light sensor 21 may be positioned adjacent to the breathing portion 11, or in other locations in other embodiments. The air pump 5 is triggered when the light sensor 21 detects a sudden decrease in light detected. In some embodiments, the at least one burial sensor 2 comprises a motion sensor 22. The air pump 5 may be triggered when the motion sensor 22 detects one or more of a variety of types of motion, such as, but not limited to, a sudden acceleration, a sudden drop, a lack of movement for a specific amount of time, or other conditions. In some embodiments, the at least burial sensor 2 may comprise both the light sensor 21 and the motion sensor 22, and both the light sensor 21 and the motion sensor 22 may be configured to activate the air pump 5 under a combination of signals from both sensors. In some embodiments, the at least one burial sensor 2 may comprise a CO2 sensor 23. In some embodiments, the at least one burial sensor 2 may comprise an infrared light sensor 21. It should be understood that the at least one burial sensor 2 may comprise other types of sensors not herein discussed, and furthermore may comprise any combination of sensors discussed and not discussed herein, and activation conditions for the air pump 5 may vary according to the type of sensors utilized, and activation conditions may depend on combinations of signals from various sensors. For example, the air pump 5 may only be activated if the CO2 sensor 23 detects increased CO2 levels from normal, the motion sensor 22 detects a stoppage in movement, and the light sensor 21 detects decreased light levels, all simultaneously or within a specified time period.

In some embodiments, the present invention further comprises a processing unit 6. The processing unit 6 may be a microprocessor, circuit board, integrated circuit, or any combination of electronic components such as, but not limited to, resistors, capacitors, transistors, diodes, and other electronic components that allows the present invention to receive electronic inputs, process data, and produce electronic outputs in order for the present invention to function as intended. The processing unit 6 is electronically connected to the at least one burial sensor 2 and the air pump 5, and the processing unit 6 is electrically connected to the power source 3.

In some embodiments, the present invention further comprises a housing 7, shown in FIG. 3. The housing 7 may be made of plastic, metal or any suitable material for housing 7 the various electronic components of the present invention, providing protection and structural integrity. Thus, in various embodiments, any or all of: the housing 7, at least one of the at least one burial sensor 2 (the motion sensor 22, the light sensor 21, and/or the CO2 sensor 23), the air pump 5, the power source 3, and the processing unit 6 may be positioned within the housing 7. Furthermore, the present invention may further comprise a power switch 8 externally connected to the housing 7.

The power switch 8 may be utilized to manually activate the air pump 5 of the present invention, or simply to turn on the present invention so as to be ready for use. In some embodiments, the power switch 8 is electrically connected directly between the power source 3 and the air pump 5. In some embodiments, the power switch 8 may be electrically connected to the processing unit 6, and/or at least one of the at least one burial sensor 2. Moreover, the present invention may further comprise additional controls, such as additional switches, buttons, touchscreens or any other controls that facilitate user control and operation of the present invention.

Figure 6:
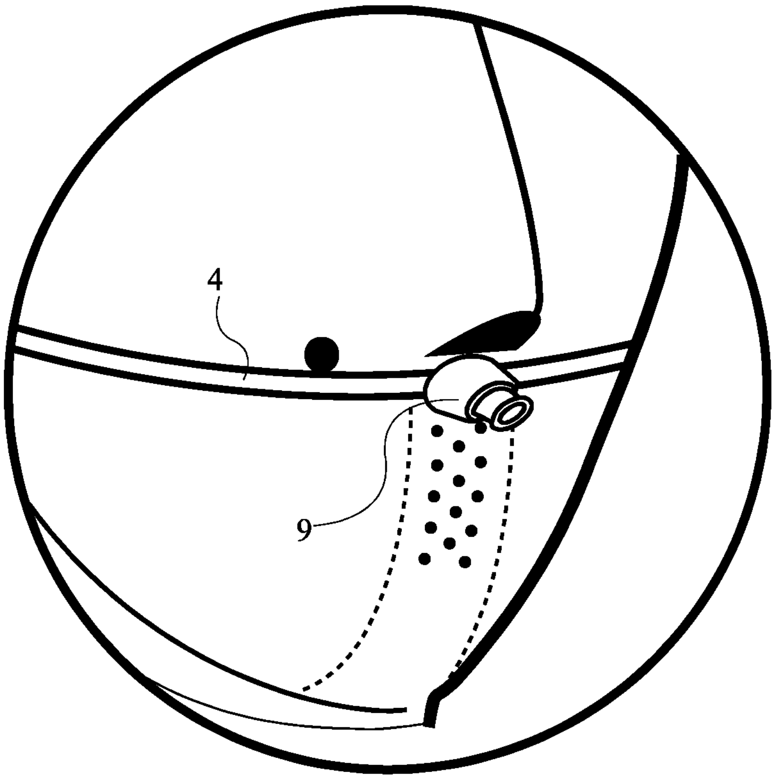
FIG. 6 is an illustration of the present invention with a mouthpiece.

Referring to FIG. 6, in some embodiments, the present invention may further comprise a mouthpiece 9. The mouthpiece 9 may be connected to the exhaust tube 4 adjacent to the intake port 41, being in fluid communication with the exhaust tube 4. This is meant as a secondary measure in case the air pump 5 malfunctions, the user may exhale into the intake port 41 in order to manually pump CO2 away from the breathing area and out of the exhaust port 42. In some embodiments, the mouthpiece 9 is a one-way air valve.

In some embodiments, the mouthpiece 9 is a reversible nipple. Thus, the mouthpiece 9 protrudes away from the user's face in an inactive position when not in use. The mouthpiece 9 may be configured in such a way to be able to be inverted from the inactive position to an active position, then occupying equivalent space adjacent the user's face as previously occupied outside the mask. The user may achieve inversion of the mouthpiece 9 by pressing on the mouthpiece 9 from the outside of the mouth, resulting in inversion of the mouthpiece 9 and subsequent intrusion of the mouthpiece 9 interiorly to the mask and the user's mouth. The user may then bite on the mouthpiece 9 to keep the mask in place during an avalanche or other burial event, avoiding displacement of the mouthpiece 9 and ensuring CO2 displacement functionality. A one-way valve on the mouthpiece 9 similar to that of a dust mask would may the user to continue moving expelled air away from the face through the exhaust tube 4 even if the battery reserve of the power source 3 becomes exhausted, utilizing their own lungs to perform the pumping action.

Although the invention has been explained in relation to its preferred embodiment, it is to be understood that many other possible modifications and variations can be made without departing from the spirit and scope of the invention as hereinafter claimed.

The invention claimed is:

1. A snow burial mask comprising:

a) a headgear including a breathing portion below a nose portion of a user and adjacent to a mouth portion of the user;

b) an exhaust tube including:

an intake tube portion connected to the headgear and positioned adjacently to the breathing portion;

an intake port traversing into the intake tube portion;

an exhaust tube portion; and an exhaust port connected to the exhaust tube portion, wherein the exhaust tube portion is opposite to a face of the user terminating into the exhaust port opposite the face of the user;

c) at least one burial sensor;

d) an air pump fluidly connected to the exhaust tube wherein the air pump is activated by the at least one burial sensor and adapted to force air away from the breathing portion and opposite the face of the user; and e) a power source and a processing unit operatively connected to the at least one burial sensor and the air pump; wherein the exhaust port is a free end that can be repositioned next to a part of the user based on a length of the exhaust tube portion, a distance between the exhaust port and the air pump is greater than a distance between the intake port and the air pump.

2. The snow burial mask of claim 1 wherein the at least one burial sensor is at least one of a burial detection sensor, a motion sensor, a light sensor, an acceleration sensor, and a CO2 sensor.

3. The snow burial mask of claim 1 wherein the air pump is automatically activated by the at least one burial sensor.

4. The snow burial mask of claim 1 further comprising a switch wherein the user can manually activate the switch thereby activating the air pump to force air away from the breathing portion and to a lower back of the user.

5. The snow burial mask of claim 1 further adapted to draw CO2 away from an airway of the user and deposit said CO2 along a back of the user.

6. The snow burial mask of claim 1 wherein the at least one burial sensor is a light sensor adapted to detect a sudden decrease in light and further configured to activate said air pump.

7. The snow burial mask of claim 1 wherein the at least one burial sensor is a motion sensor adapted to detect at least one of a lack of movement for a specific amount of time, a sudden acceleration, and a sudden drop and further configured to activate said air pump.

8. The snow burial mask of claim 1 wherein the at least one burial sensor is a CO2 sensor adapted to detect an increase in CO2 and further configured to activate said air pump.

9. The snow burial mask of claim 1 wherein said air pump is adapted to remove an exhaled air of the user thereby removing fog from a goggle of the user.

10. The snow burial mask of claim 1 further comprising a mouthpiece being in communication with the exhaust tube wherein the mouthpiece is connected to the intake port and wherein the mouthpiece is a one-way valve adapted to manually move expelled air away from a face of the user through the exhaust tube using a lung of the user to perform a pumping action.

11. The snow burial mask of claim 10 wherein the mouthpiece is a reversible nipple in such a way that the mouthpiece is able to be inverted between interiorly protruding into the breathing portion and exteriorly protruding away from the breathing portion.

12. The snow burial mask of claim 1 wherein the exhaust tube portion is to be placed along a back of the user terminating into an exhaust port to be placed at a lower back the user.

13. A snow burial mask system comprising:

a) a headgear including a breathing portion below a nose portion of a user and adjacent to a mouth portion of the user;

b) an exhaust tube including:

an intake tube portion connected to the headgear and positioned adjacently to the breathing portion;

an intake port traversing into the intake tube portion;

an exhaust tube portion; and an exhaust port connected to the exhaust tube portion, wherein the exhaust tube portion is opposite to a face of the user terminating into the exhaust port to be placed along a back of the user;

c) at least one burial sensor including at least one of a motion sensor, a light sensor, an acceleration sensor, and a CO2 sensor;

d) an air pump fluidly connected to the exhaust tube wherein the air pump is activated by the at least one burial sensor, adapted to force air away from the breathing portion and opposite a face of the user and further adapted to draw CO2 away from an airway of the user and deposit said CO2 opposite the face of the user through the exhaust port; and e) a power source operatively connected to the at least one burial sensor and the air pump; wherein the exhaust port is a free end that can be repositioned next to a part of the user based on a length of the exhaust tube portion, a distance between the exhaust port and the air pump is greater than a distance between the intake port and the air pump.

14. The snow burial mask system of claim 13 wherein the exhaust tube portion and the exhaust port are along a back of the user.

15. The snow burial mask system of claim 14 further comprising coupling means allowing the user to affix the exhaust port to a clothing of the user.

16. The snow burial mask system of claim 13 further comprising a harness adapted to be worn by the user wherein the exhaust tube portion is to be placed along a lower back of the user.

17. The snow burial mask system of claim 13 further comprising a housing including a processing unit operatively connected the power source, the at least one burial sensor, the exhaust tube and the air pump wherein the housing includes the power source, the at least one burial sensor, the exhaust tube and the air pump.

18. The snow burial mask system of claim 13 further comprising a switch adapted to manually power said air pump wherein a user can manually operate said switch to operate the snow burial survival mask system and said air pump.

19. The snow burial mask system of claim 13 further comprising a mouthpiece being in communication with the exhaust tube wherein the mouthpiece is connected to the intake port and wherein the mouthpiece is a one-way valve adapted to manually move expelled air away from a face of the user through the exhaust tube using a lung of the user to perform a pumping action.

20. The snow burial mask of claim 19 wherein the mouthpiece is a reversible nipple in such a way that the mouthpiece is able to be inverted between interiorly protruding into the breathing portion and exteriorly protruding away from the breathing portion.

* * * * *